Figure 1:
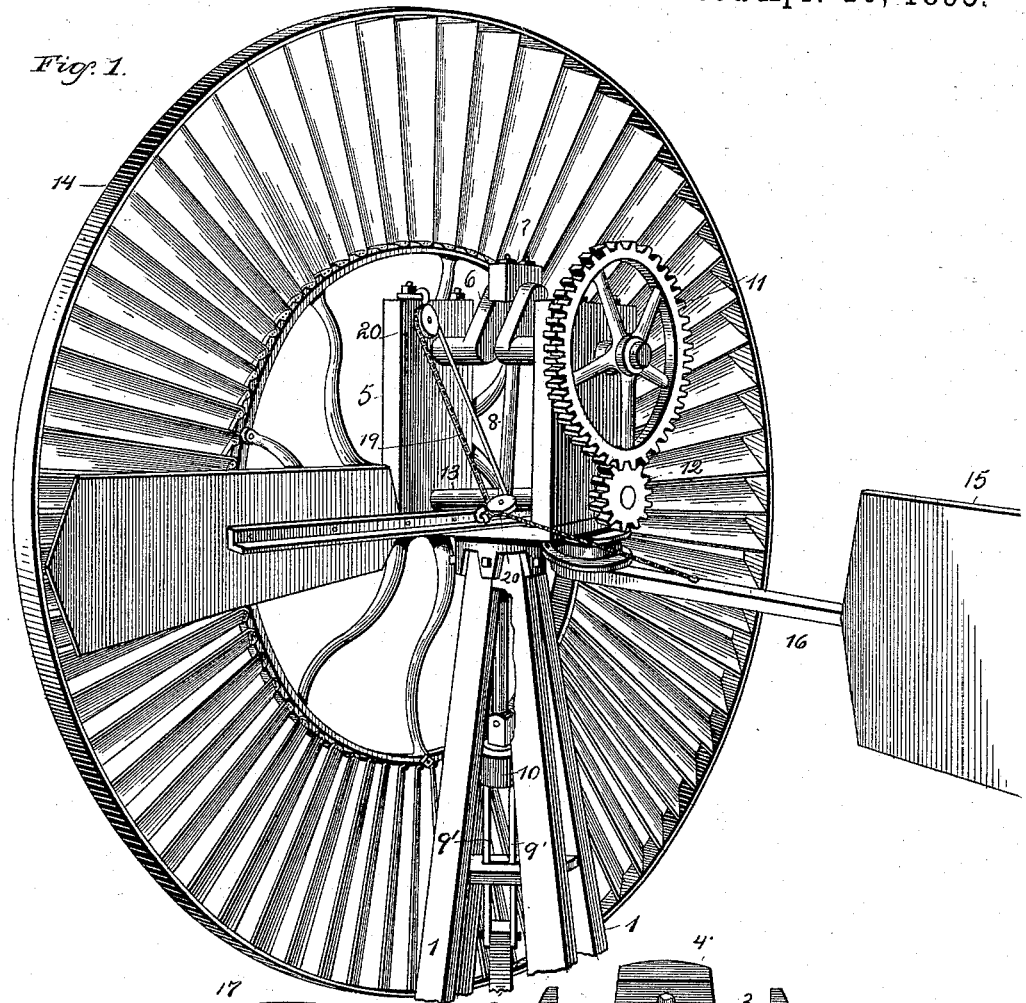

(No Model.) 2 Sheets—Sheet 1.

W. KOUNS.
BALL BEARING FOR WINDMILLS.

No. 537,689. Patented Apr. 16, 1895.

Witnesses.
Victor J. Evans.
Marie Wilson

Inventor
Wesley Kouns.
By E. M. Neath & Son
Attorneys.

THE NORRIS PETERS CO., PHOTO-LITHO., WASHINGTON, D. C.

(No Model.) 2 Sheets—Sheet 2.

W. KOUNS.
BALL BEARING FOR WINDMILLS.

No. 537,689. Patented Apr. 16, 1895.

Witnesses.
Victor J. Evans.
Marie Wilson

Inventor.
Wesley Kouns.
By E. M. Marble & Sons
Attorney.

UNITED STATES PATENT OFFICE.

WESLEY KOUNS, OF SALINA, KANSAS.

BALL-BEARING FOR WINDMILLS.

SPECIFICATION forming part of Letters Patent No. 537,689, dated April 16, 1895.

Application filed December 1, 1894. Serial No. 530,557. (No model.)

*To all whom it may concern:*

Be it known that I, WESLEY KOUNS, a citizen of the United States, residing at Salina, in the county of Saline and State of Kansas, have invented certain new and useful Improvements in Ball-Bearings for Windmills and the Like; and I do hereby declare the following to be a full, clear, and exact description of the invention, such as will enable others skilled in the art to which it appertains to make and use the same.

My invention relates generally to improvements in wind-mills, and more particularly to improvements in connections between rotating parts, such for instance, as that which exists between the pitman-rod and the pump-rod of a wind-mill, and it consists in a ball bearing, which serves, not only to lessen the friction between the rotating parts, but also to hold said parts together and form a secure connection, the construction and arrangement of the parts of which will be hereinafter fully described and particularly pointed out in the claims.

In the construction of wind-mills, and all other forms of mechanism in which it is necessary to connect two parts together in such a manner as to permit one to rotate about its axis while the other remains stationary, great difficulty has been found in providing a connection which will be at the same time simple in construction, efficient in operation, and durable. Many contrivances have been resorted to to accomplish this end, and some of them have been found very satisfactory, but there is a complexity attending the construction of all of them, which my invention is designed to avoid.

The object of my invention, then, is to provide a connection between two parts, one of which is so arranged as to be permitted to rotate about its axis while the other is stationary in regard to that axis, which is simpler, more efficient, and better adapted for general purposes of use than any which is upon the market.

My invention consists in a form of ball bearing, which bearing not only serves the useful purpose of diminishing the friction between the parts in connection with which it is used, but also acts to hold said parts together as firmly and securely as can be done in any other way.

The essential characteristics of my bearing are, first, registering semi-circular annular grooves formed on the meeting surfaces of the two parts, in which the balls roll, and serve, not only to diminish the friction between the moving parts, but by abutting against the tops of the grooves, to also firmly and securely hold said parts together, and, second, semi-circular grooves leading from said annular grooves to one face of the parts, which, when in registering position, will allow the insertion of the anti-friction balls into the annular grooves.

In the drawings which accompany and form a part of this application I have represented my improved ball bearing as applied to the construction of a wind-mill, as that is the use for which I have more particularly designed my bearing, though I do not restrict myself to such use, and as the two or three forms of bearings which are necessarily presented in a wind-mill furnish a good opportunity for exemplifying the various ways in which I may use my ball bearing.

Figure 2:
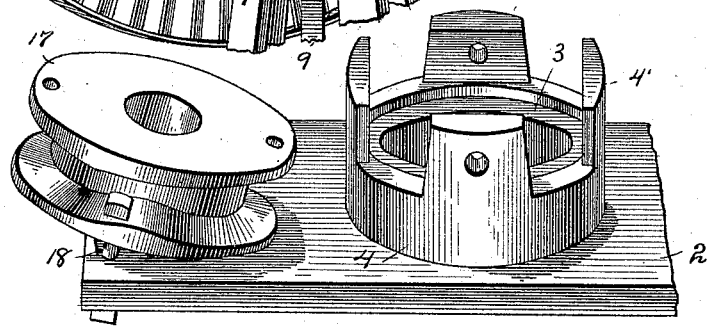
Figure 6:
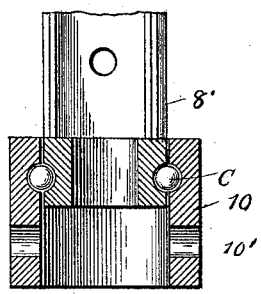
Figure 3:
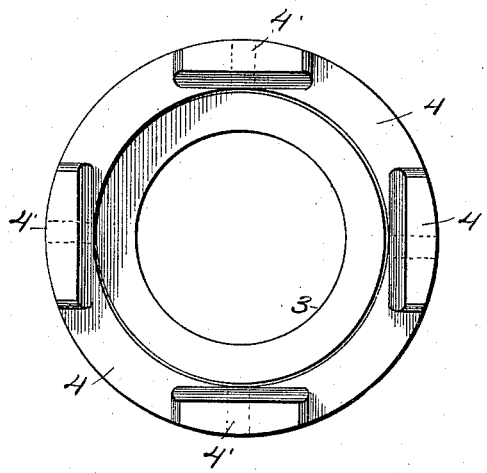
Figure 4:
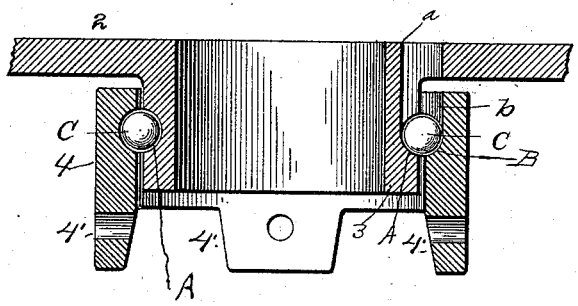
Figure 5:
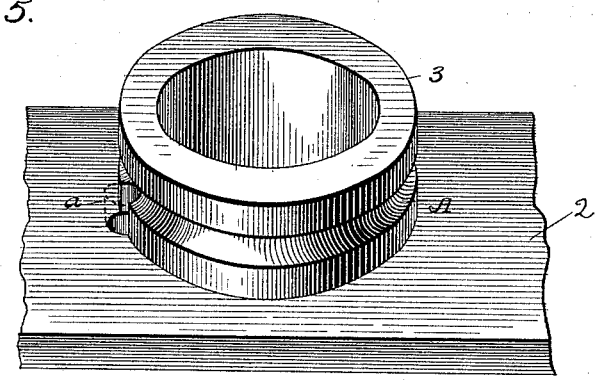

In the drawings, in which the same reference letters and numerals refer to the same or corresponding parts, Figure 1 is a perspective view of a wind-mill, having my improved bearing in position thereon, parts of the windmill standard being broken away to more clearly show the pump-rod. Fig. 2 is a detail perspective view of the rotating frame on which the bearings are mounted which provide for the rotation of the wind-wheel, and also for the movement of the governing vane. Fig. 3 is a bottom plan view of one of these bearings. Fig. 4 is a section of the bearing shown in Fig. 3, illustrating the interior registering semi-circular annular grooves in which the anti-friction balls move, and also showing in registering position the vertical semi-circular grooves through which said anti-friction balls are inserted. Fig. 5 is a detail perspective view of the portion of the revolving frame on which the wind-wheel and mechanism connected therewith are mounted, showing the boss formed thereon in which the grooves are cut which permit the insertion and action of the anti-friction balls. Fig. 6 is a detail view, partly in section, of the connection between the pitman-rod and the pump-rod.

Referring to the drawings, 1 represents the wind-mill standard, about which the wind-wheel, and operative mechanism connected therewith, rotate upon the base frame 2. This base frame, as an element of the ball-bearing, may be generally termed a hollow casting. On the under surface of this rotating frame is formed a hollow boss or projection 3, on the outer surface of which are formed grooves or channels which register with the corresponding grooves or channels formed on the supporting block or casting 4, which caps the standard 1, the lugs 41 allowing the attachment of the same to the said standard. By the insertion of anti-friction balls into the registering grooves formed on these parts, in a manner hereinafter to be described, an entirely secure connection is formed between the revolving frame and the supporting block or casting 4, which permits said frame to have a free and unimpeded movement in its action, thereby allowing the wind-wheel to readily adjust itself to variations in the direction of the wind. On the ends of the revolving frame are bolted upwardly projecting side supports 5, in which the crank shaft 6 is journaled. To this shaft is attached by box 7 the pitman rod 8, which is made of flat spring steel. By virtue of its spring construction the pitman-rod has the side movement necessary for its operation without necessitating the use of the ball and socket joint. The lower end of the pitman-rod is attached by the connection 10 to the pump-rod 9, two side pieces 9' of the pump-rod extending upward and projecting through holes 10' in the lower part of the connection, and the pitman being bolted to the upwardly extending grooved piece 8'. On one end of shaft 6 is secured a gear-wheel 11, which meshes with the pinion 12 formed on shaft 13, which shaft has bearings in the side supports 5, and carries the wind-wheel 14.

15 is an ordinary governing vane, used to keep the large wind-wheel always directly in the wind, when such wheel is in operation, and to swing said wheel out of the wind when it is desired to suspend the operation of the wheel. This vane is attached to the vane-rod 16, which is connected by the connection 17 to the revolving frame 2, said connection being downwardly inclined as shown in Fig. 2, by means of pins 18, in order to cause the vane to, of itself, gravitate to the position in which to hold the wind-wheel in action, and constantly remain in such position. The chain or rope 19 is attached to said vane rod, which, passing around pulley 20, and through the central aperture formed in the revolving frame at the base of the boss 3, extends downward to the base of the standard 1, where it can be attached to a suitable cleat and conveniently operated.

Having thus described in brief the general construction of my wind-mill, and having shown three instances in which I can use my improved bearing in the construction of the same, I will now proceed to describe with some detail the form of the bearing itself, taking, for the purpose of illustration, the connection between the rotating frame 2 and the supporting block 4, which caps the standard 1.

On the outer surface of the boss 3 formed on the rotating base frame 2, I form an annular semi-circular groove A. At an inclination to this groove, and preferably at right angles thereto, I form another semi-circular groove $a$ which leads to one face of the casting. On the inner surface of the supporting block 4, I form corresponding grooves B and $b$, the groove B being annular, and the groove $b$ erect. The annular grooves register at all times and form a passageway sufficiently large to permit free operation of the anti-friction balls inserted therein through the vertical grooves $a$ and $b$, when these grooves are in registering position. It will be seen that when a sufficient number of these anti-friction balls are in position in the annular semi-circular grooves, they will afford a very perfect bearing to diminish the friction between the moving parts, and will, at the same time, hold the parts together, since each ball has a bearing on the shoulder formed at the top and bottom of the grooves cut in the moving parts. The bearing thus afforded is unrivaled in simplicity, and has been found in actual use to work to extreme satisfaction. It will be further seen that since the anti-friction balls can only be inserted or removed from the bearing when the vertically arranged semi-circular grooves register, and since the force of gravity prevents the balls from of themselves escaping from the annular grooves, it is impossible for the balls to escape from the bearing after they have once been inserted therein. Its action is at all times perfect, and the pitman and pump-rod are held together in such a manner that there is no possibility for their escape from each other. In the case thus noted, one of the castings in which grooves are cut is a boss on a plate. In the case of the connection shown between the governing vane and the rotating base 2, both of the castings in which the grooves are cut are separate from any plate, and are complete castings themselves. This is also true in regard to the connection shown between the pitman and the pump-rod. It will thus be seen that the construction of the castings in which the grooves are cut may be varied at will, and that the castings may be so arranged that only one of them will have a rotative action, or so that both of them, if so desired, may rotate about each other. The construction of my bearing remains the same in any case, no additional elements being needed to enable it to operate in the different positions in which it may be placed, and thus its simplicity remaining uniform in all constructions.

I do not limit myself to any size of castings or grooves cut therein, as the size may be varied according to the demands of the particular connection; neither do I limit myself to vertical grooves meeting annular grooves, as the angle of inclination may be changed without affecting the operation of the connection; nor do I limit myself to the use of my bearing in connection with wind-mills, as I may use it in any other mechanism in which its use is possible.

What I claim as new, and desire to secure by Letters Patent, is—

1. In a ball bearing, the combination with a hollow casting, having on its inner surface an annular semi-circular groove, and a semi-circular groove leading from the annular groove to one surface of the casting, of another casting adapted to fit into the hollow casting, having formed on its periphery a corresponding annular semi-circular groove, and a groove leading to a corresponding face of the same, and adapted to register with the corresponding groove formed in the hollow casting, and anti-friction balls adapted to be inserted through the said grooves which lead to the face of the castings when in registering position, and to move in the annular semi-circular grooves, thereby acting not only to lessen the friction between the parts, but to hold the same together, substantially as described.

2. In a ball bearing, the combination with a hollow casting having on its inner surface an annular semi-circular groove, and a vertically arranged semi-circular groove leading therefrom to one face of the casting, and another casting adapted to fit in said hollow casting, and having formed on its periphery an annular semi-circular groove and a vertical semi-circular groove leading therefrom to a corresponding face, and anti-friction balls adapted to be inserted through said vertically arranged grooves and to move in the annular grooves, thereby acting to lessen the friction, and also to hold the parts together, substantially as described.

In testimony whereof I affix my signature in presence of two witnesses.

WESLEY KOUNS.

Witnesses:
T. D. FITZPATRICK,
D. A. VAN TRINE.